United States Patent [19]
Rudd et al.

[11] 3,781,162
[45] Dec. 25, 1973

[54] REDUCING NOX FORMATION BY COMBUSTION

[75] Inventors: Alexander H. Rudd, Akron; John H. Kidwell, Alliance; Thomas J. Murray, Wadsworth, all of Ohio

[73] Assignee: The Babcock & Wilcox Company, New York, N.Y.

[22] Filed: Mar. 24, 1972

[21] Appl. No.: 237,850

[52] U.S. Cl. .................................................. 431/115
[51] Int. Cl. ................................................. F23l 7/00
[58] Field of Search .................. 431/115, 116, 9, 431/2; 110/72

[56] References Cited
UNITED STATES PATENTS
3,146,821  9/1964  Wuetig ........................... 431/115 X
2,688,360  9/1954  Haynes et al. ..................... 431/115
2,310,096  3/1967  DeLivois .......................... 431/115

Primary Examiner—Edward G. Favors
Attorney—J. Maguire

[57] ABSTRACT

Apparatus for mixing recirculated flue gases with combustion air delivered to a furnace to reduce the formation of $NO_x$ caused by the combustion of fuel. The recirculated gas is mixed with combustion air prior to delivery of the mixture to the furnace so that the mixture is substantially uniform when delivered to the combustion chamber.

8 Claims, 3 Drawing Figures

REDUCING NOX FORMATION BY COMBUSTION

The present invention relates to apparatus for burning fuel with a reduction in the quantity of nitrogen oxides formed during the combustion of the fuel. Particularly the invention relates to a system for controlling the combustion of the fuel so as to minimize the formation of nitrogen oxides during combustion.

Nitric oxide (NO) and nitrogen dioxide ($NO_2$) are often contained in the exhaust gases from combustion processes. Their presence is due to formation of NO during combustion and subsequent oxidation of a small part of the NO to $NO_2$ by residual oxidation in the products of combustion passing through a furnace chamber. After release to the atmosphere, oxidation of NO continues, and the resulting $NO_2$ is an air pollutant. Nitrogen dioxide is best known for its participation in smog formation, but also exhibits some deleterious effects of its own. Since NO is, from an air pollution point of view, synonymous with $NO_2$, the two are often combined and referred to as $NO_x$.

Not all combustion processes operate at sufficiently high temperature to produce significant quantities of $NO_x$. The major producers are the automobile, and industrial and utility boilers. Reduction of $NO_x$ emissions from utility boilers on the West Coast in the late 1950's is one of the earliest examples of air pollution control. This was achieved primarily by a modification of the combustion process known as two-stage combustion as disclosed in U.S. Pat No. 3,048,131. More recently $NO_x$ pollution has been shown to be a general nuisance in many parts of the country, and work has begun in both the automobile industry and continued in the boiler industry to reduce $NO_x$ emmissions to the atmosphere.

The amount of $NO_x$ formation in a boiler furnace is determined by the temperature and composition history of the combustion gas during and after combustion. This is related in turn to fuel supply conditions and other operating and design factors of the boiler. Some of the primary factors found to be of importance to $NO_x$ production relate to the rate of fuel supply and the values of oxygen available during and immediately after combustion of the fuel (i.e., excess air used in the combustion process), the configuration and rate of cooling in the combustion chamber, and the temperature of the combustion air delivered to the furnace and combined with the fuel during the combustion process. All of such factors affect the generation of $NO_x$ during fuel combustion by directly or indirectly influencing temperatures in the combustion chamber.

Heretofore, reduction of $NO_x$ production in existing large industrial and utility boiler units has been attempted by the injection of recirculated flue gases into the combustion chamber. This has not always been successful, since it is important the recirculated flue gas be well mixed with the combustion air so that each of the multiple burners in such an installation receives its proportionate share of oxygen for fuel combustion purposes. The burner or burners getting the least oxygen (because of faulty mixing or gas distribution) would either smoke or have unstable and incomplete combustion of the fuel thereby limiting the amount of gas recirculation and the degree of $NO_x$ reduction.

According to the present invention it has been found that recirculated gases can be intimately and thoroughly mixed with combustion air upstream of the point of fuel introduction into the boiler combustion chamber. In the usual boiler unit some device is provided to measure the combustion air flow to the combustion chamber and in many installations the device may take the form of a restriction in the air supply duct such as a venturi or a venture-like tube, or one or more air foils. Advantageously in the present invention the recirculated gases, for $NO_x$ reduction purposes, is added downstream of the air flow restriction (in an airflow sense) to minimize the pressure and thus the power required by the recirculated gas fan, and to insure intimate mixing of the recirculated gases with the combustion air. Of the drawings:

Figure 1:
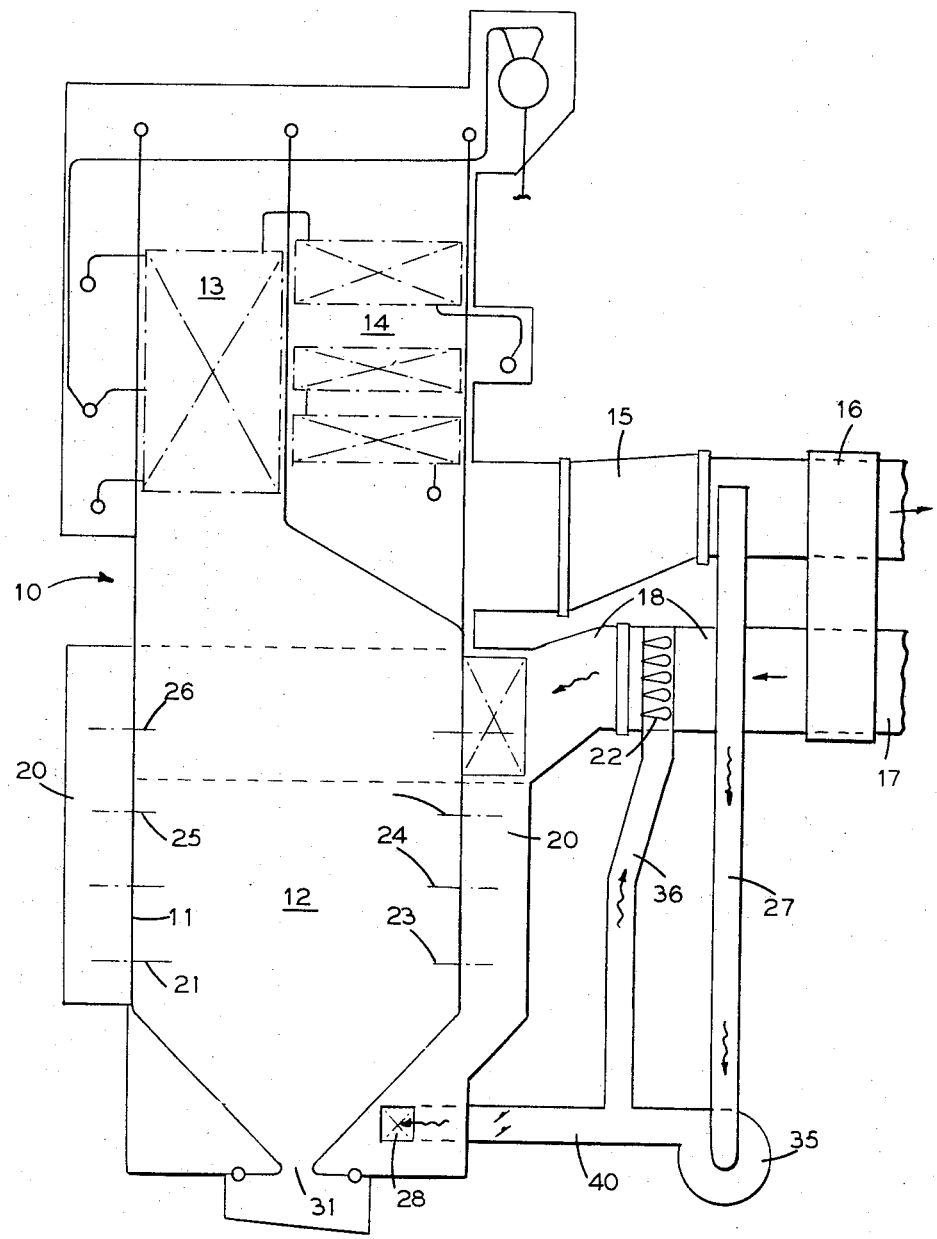
FIG. 1 is a schematic elevation of a conventional power boiler incorporating the present invention.

In the illustrated embodiment of the invention depicted in FIG. 1 a conventional power generation boiler is shown. In the particular arrangement the furnace and boiler setting 10 includes steam generating tubes 11 so arranged that a combustion chamber 12 is positioned in the lower portion of the setting. The gases of combustion produced in the combustion chamber pass upwardly over vapor heating surfaces 13, turn and then pass downwardly over additional heat exchange surfaces 14 before discharge through a connecting duct 15 to a conventional air heater 16. The heat exchange surfaces may include superheater elements, reheater elements, and economizer surfaces. The surfaces are intended to heat the fluids passing therethrough and to reduce the temperature of the flue gas discharging from the setting 10 through the duct 15 to the air heater 16.

The air heater illustrated is of the regenerative type where relatively low level heat from the flue gas is transferred to combustion air entering through a duct 17 which is thereafter passed through a duct 18 to a windbox 20 and burner ports 21 serving the chamber 12. Ordinarily, in units of the type described the combustion air flow to the burner ports 21 is regulated to be in proper flow relationship to the fuel also being supplied through burners positioned in the ports 21 and thus to the combustion chamber 12. To this end, in many installations streamlined air foils 22 are installed in the air duct 18 so as to measure the flow of air therethrough and to provide a measurement for use in the fuel-air control of the unit. The air foils illustrated in FIG. 1 are shown in greater detail in FIGS. 2 and 3 and will be more completely described hereinafter.

In the arrangement shown in FIG. 1, the burner ports 21 are arranged to utilize either oil or gas fuel. The burners, as illustrated, are each located in a burner port with the ports positioned in opposite walls of the combustion chamber 12 and arranged in vertically spaced rows 23, 24 and 25 with the ports and the burners horizontally spaced in each row. In the arrangement illustrated each row 23 and 24 of burners and burner ports in the lowermost portion of the chamber 12 contain 4 horizontally spaced burners while the uppermost row 25 contains 2 burners. It will be appreciated that greater or lesser numbers of ports and burners may be utilized, and any fuel could be used.

In the installation illustrated in FIG. 1, a row of ports 26 is positioned above the uppermost row 25 of burners. Specifically, in the embodiment shown, there are 4 ports in each row 26 and the spacing in a vertical direction between the uppermost row 25 of the burner ports and the ports 26 is equal to or greater than the vertical spacing between the rows 23, 24 and 25 of fuel burner ports.

In the embodiment shown, gas recirculation is utilized for vapor temperature control purposes. Such gases may be introduced into the furnace at any of various positions. As shown, gases are withdrawn from the duct 15 and passed through connecting ducts 27, through fan 35 and duct 40, to gas plenum chambers 28 formed beneath the inclined tubes 30 defining the bottom of the chamber, and which receive the recirculated gas and pass this gas upwardly through an opening 31 in the bottom of the furnace to mix with the products of combustion in passing over the heat exchange surfaces 13 and 14 in the upper portion of the setting 10. As is well known in the art, recirculated flue gases when used for vapor temperature control purposed increase with the decrease in the rate of fuel firing. The intent of this type of operation is to regulate gas mass flow over the heat exchange surfaces 13 and 14. This regulates heat exchange to the vapor heating surfaces during low load operations.

It has recently been found that the addition of recirculated gases with the combustion air admitted to the burners with the fuel aids in reducing the nitrogen oxide produced during the combustion process. One of the difficulties heretofore encountered has been related to a proper mixing of the recirculated gases with the combustion air as the two gases are injected into the combustion chamber. Ordinarily, the use of recirculated gases to the furnace chamber for nitrogen oxide control purposes has required a maximum flow of such gases to the furnace during periods of maximum fuel combustion. That is, of course, the reverse of the normal use of recirculated gases for vapor temperature control purposes.

In accordance with the present invention, the recirculated gases removed from the flue gas duct 15 are mixed with the combustion air before the mixed gases are delivered to the windboxes 20 of the furnace setting. In the usual installation the air flow duct through which combustion air is supplied to the windbox and thereafter into the furnace is provided with some device for measuring the flow of air through the duct. This device commonly is a restriction, such as an orifice of the plate type, one or more venturis or venturilike tubes, or in many installations one or more air foils arranged in parallel to permit air flow measurements by differential pressures. The restrictive devices are selected to minimize loss of pressure in the air flowing through the duct for fan power economy while also providing sufficient differential pressure values for adequate flow measurement. With such restrictions in the air flow duct we have found that the recirculated flue gases used for $NO_x$ control purposes can advantageously be admitted to the air stream downstream of the restrictor for air and gas mixing purposes while minimizing fan pressure and power requirements in the recirculated flue gas duct opening into the air flow duct.

In the embodiment shown the air foils 22 are utilized for mixing purposes to ensure a substantially uniform and adequate mingling of combustion air and recirculated gases before they enter the combustion chamber 12.

Figure 2:
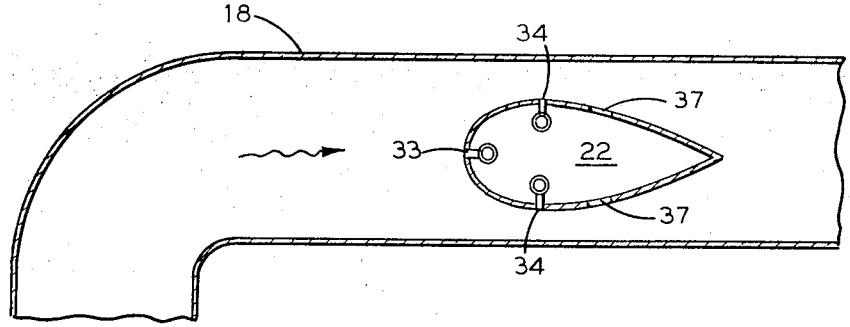
FIG. 2 is an enlarged view, in section, of a portion of the apparatus shown in FIG. 1; an FIG. 3 is an isometric view, partly in section, of the apparatus shown in FIG. 2.
Figure 3:
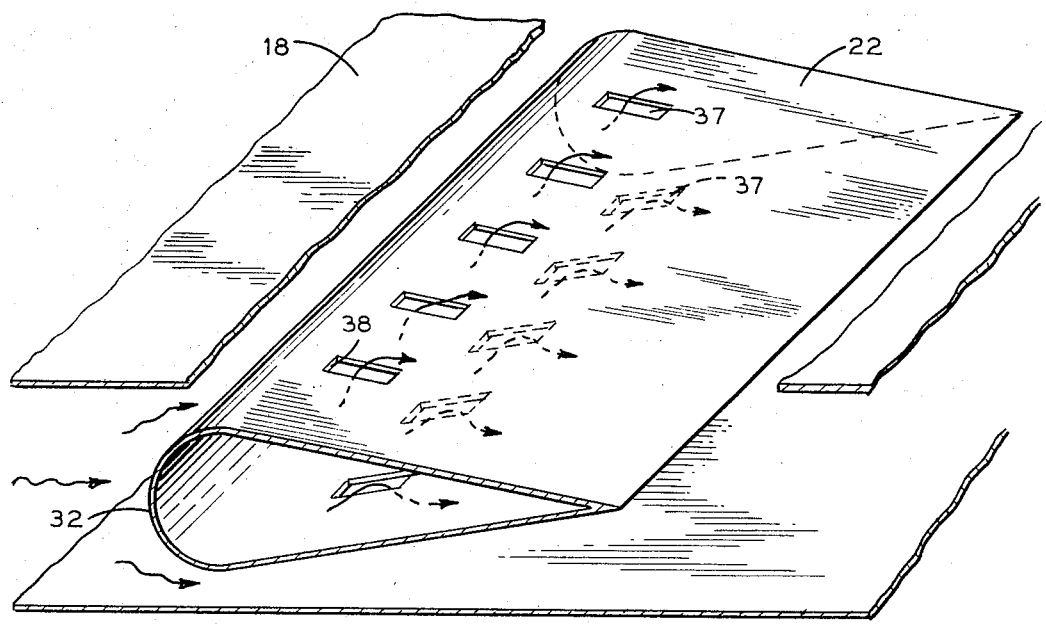

Referring to FIGS. 2 and 3 it will be noted the air foils 22 as ordinarily installed for air flow measurement purposes are positioned in the duct 18 in single or multiple layers, depending upon the volume of air flow, with the large end 32 of the air foil facing upstream insofar as air flow direction is concerned. In the usual air flow measurement procedure, a pressure measurement is obtained by positioning a tap 33 on the upstream facing edge of the air foil. One or more taps 34 are positioned at right angles to the air flow direction adjacent the thickest portion of the air foil. The differential pressure measurements between the taps 33 and 34 will be indicative of the rate of air flow through the duct 18. This differential pressure measurement when properly calibrated can be utilized to measure the rate of air flow through the duct, and has also been utilized in air flow-steam flow control arrangements to coordinate air and fuel delivery to the combustion chamber 12.

Recirculated gas is passed from the duct 27 through a recirculated gas fan 35 and a dampered branch duct 36 with the recirculated gases delivered to the interior of the air foils 22. Ordinarily, such gases are delivered to both ends of the hollow air foil particularly when the length of the air foil is substantial, as is usually encountered in a large capacity boiler unit.

As shown particularly in FIG. 3, and in accordance with the present invention, openings 37 are provided in the air foil to interconnect the interior of the air foil with the flow path of the combustion air stream along the exterior surface of the foil. These openings are spaced along the longitudinal length of the air foil at positions down stream of the maximum thickness of the air foil shape. With the openings so positioned the aspiration effect of combustion air flow over the foils will tend to draw recirculated gas from the hollow foils into the stream of air passing through the air duct 18. Due to such flow it has been found that the recirculated gases intimately mix with the combustion air so that a nearly equally mixed combination of the two gases may be delivered to the wind box 20 and through each of the ports 23, 24 and 25 with the fuel to the combustion chamber 12.

In the arrangement shown in FIG. 1, the concept of U.S. Pat. No. 3,048,131 may also be used with the present invention by passing a controlled portion of the mixture of combustion air and recirculated flue gases through the ports 26. Under such circumstances fuel will not usually be introduced through the ports 26 with the mixture of air and gas. Such a combination will have a further effect in reducing the formation of $NO_x$ by fuel combustion.

Good mixing of recirculated flue gas from the interior of each foil into the combustion air passing over the exterior of the foil can be accomplished by forming the openings 37 as slots having a length four to six times the width and having an inter port spacing of from three to eight times the width of each slot. In addition, the upstream edge 38 of the slot should be at least 15° of the widest part of the foil. Under these conditions it has been found the mixing of air and gas is substantially complete.

In operation of a combustion unit of the type shown in FIG. 1, when firing oil or gas the amount of gas recirculated through the foils should be in the range of 10 to 22 percent of the combustion air required for fuel combustion to maintain $NO_x$ production at low values.

We claim:

1. Apparatus for reducing the production of $NO_x$ by fuel combustion which comprises walls defining a combustion chamber, means defining a plurality of burner ports in a wall of the combustion chamber, burner means positioned to inject fuel into the combustion chamber through each of the burner ports, a windbox enclosing the burner ports for the delivery of combustion air through the burner ports with the fuel injected therethrough for combustion of fuel in the combustion chamber, air flow duct means connecting the windbox with a source of preheated combusted air, means including a restrictor for measuring and dampers and a fan for regulating the flow of combustion air through the duct means to the windbox in coordinated response to the rate of fuel flow through the ports, flue gas duct means interconnecting the gas discharge end of the combustion chamber with the air flow duct means adjacent the restrictor, said flue gas duct means including dampers and a recirculated gas fan for passing recirculated flue gas to the air flow duct for mixing flue gas with the preheated combustion air and delivered the mixture gases through siad burner ports to reduce the percentage of oxygen present in the gas mass delivered to the combustion chamber and to thereby reduce the formation of $NO_x$ by fuel combustion.

2. Apparatus according to claim 1 wherein the recirculated flue gas duct opens into said air flow duct at a position downstream, in an air flow sense, of the flow restrictor.

3. Apparatus according to claim 2 wherein said air flow restrictor consists of at least one foil extending across the duct.

4. Apparatus according to claim 3 wherein the foil is hollow and the recirculated flue gas duct opens into the hollow foil with a transversely spaced series of gas discharge openings positioned to discharge through the foil into the air stream passing over the foil downstream of the maximum transverse dimension of the foil.

5. Apparatus according to claim 4 wherein the recirculated gas duct opens into the opposite ends of said foil.

6. Apparatus according to claim 2 wherein the air flow restrictor consists of a venturi-like tube.

7. Apparatus according to claim 6 wherein the recirculated flue gas opens into the air stream passing through the venturi-like tube around and downstream in an air flow sense of the minimum cross-sectional area of the venturi-like tube.

8. Apparatus according to claim 1 wherein ports are provided in said wall spaced from the burner ports and within the windbox for the controlled introduction of mixed combustion air and recirculated gases only into combustion chamber.

* * * * *